US009292604B2

(12) United States Patent
Choudhary et al.

(10) Patent No.: US 9,292,604 B2
(45) Date of Patent: Mar. 22, 2016

(54) CRAWLING RICH INTERNET APPLICATIONS

(71) Applicant: International Business Machines Corporation, Armonk, NY (US)

(72) Inventors: Suryakant Choudhary, Ottawa (CA); Paul Ionescu, Kanata (CA); Guy-Vincent Jourdan, Ottawa (CA); Iosif V. Onut, Ottawa (CA); Gregor von Bochmann, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/032,617

(22) Filed: Sep. 20, 2013

(65) Prior Publication Data
US 2014/0081946 A1    Mar. 20, 2014

(30) Foreign Application Priority Data

Sep. 20, 2012 (CA) ..................................... 2790379

(51) Int. Cl.
*G06F 7/00* (2006.01)
*G06F 17/30* (2006.01)
(52) U.S. Cl.
CPC ................ *G06F 17/30864* (2013.01)
(58) Field of Classification Search
CPC ...... H04L 67/10; H04L 67/02; G06Q 40/025; G06F 21/53
USPC .......................................................... 707/709
See application file for complete search history.

(56) References Cited

U.S. PATENT DOCUMENTS

| 8,230,039 | B2 * | 7/2012 | Corbett ......................... 709/217 |
| 8,655,865 | B1 * | 2/2014 | Sankaran et al. ............. 707/711 |
| 2009/0288099 | A1 * | 11/2009 | Rybak et al. .................. 719/313 |
| 2009/0327261 | A1 * | 12/2009 | Hawkins .......................... 707/5 |
| 2010/0185599 | A1 * | 7/2010 | Greenfield et al. ........... 707/706 |
| 2011/0066609 | A1 | 3/2011 | Ashkenazi et al. |
| 2011/0173178 | A1 | 7/2011 | Conboy et al. |

FOREIGN PATENT DOCUMENTS

WO    2010113962 A1    10/2010

OTHER PUBLICATIONS

Benjamin, K. et al., "Some Modeling Challenges when Testing Rich Internet Applications for Security", Journal Proceedings of the VLDB Endowment VLDB Endowment Hompage archive vol. 1 Issue 2, Aug. 2008, 7 pages.

(Continued)

*Primary Examiner* — Hosain Alam
*Assistant Examiner* — Nicholas Allen
(74) *Attorney, Agent, or Firm* — Cantor Colburn LLP; Rahan Uddin

(57) ABSTRACT

Embodiments relating to a computer-implemented process, an apparatus and a computer program product is provided for crawling rich Internet applications. In one aspect the method includes executing an event in a set of events discovered in a state exploration phase according to a predetermined priority of events in each set of events in the sets of events discovered, wherein the event from a higher priority is exhausted before an event from a lower priority is executed and determining any transitions. Responsive to a determination that there are at least one transition any remaining set of events is executed in a transition exploration phase. In addition the method determines the existence of any new states as a result of executing an event in the set of events and returns to the state exploration phase, responsive to a determination that a new state exists.

17 Claims, 9 Drawing Sheets

(56) References Cited

OTHER PUBLICATIONS

Duda, Cristian et al., "AJAXSearch: Crawling, Indexing and Searching Web 2.0 Applications", Web Engineering, 2008. ICWE '08. Eighth International Conference on Issue Date: Jul. 14-18, 2008, 4 pages.

Mesbah, Ali et al., "Crawling AJAX by Inferring User Interface State Changes", Software Testing, Verification, and Validation Workshops (ICSTW), 2010 Third International Conference on Issue Date: Apr. 6-10, 2010, 18 pages.

* cited by examiner

Crawling system
300

CRAWLING RICH INTERNET APPLICATIONS

This application claims priority to Canadian Patent Application No. 2790379, filed 20 Sep. 2012, and all the benefits accruing therefrom under 35 U.S.C. §119, the contents of which in its entirety are herein incorporated by reference.

BACKGROUND

This disclosure relates generally to content discovery using a data processing system and more specifically to crawling rich Internet applications using the data processing system.

Web application crawling is a basis of content indexing. To index and find new information, a search engine should be able to crawl the web applications efficiently. Crawling is also critical to tools that perform analysis of the web applications, for example, for security, compliance and accessibility testing.

The introduction of newer and richer technologies for web application development has provided web-applications, which are more useable and interactive. These applications referred to as rich Internet applications (RIAs) have changed traditional web applications resulting in the more responsive applications with an improved user experience.

Rich Internet applications computations can be processed on the client-side using scripts that enable a user to modify the user interface (partially or completely) by triggering events defined on the user interface components (for example hypertext markup language (HTML) elements). Asynchronous communication enables the user to retrieve parts of the web pages, and enables web designers to start building very complex and interactive web applications.

The improvements while typically increasing the usability of web applications introduced many web application crawling challenges. A significant challenge is that traditional crawling techniques are no longer compatible with web applications built using the new technologies, because a universal resource locator (URL) does not change and the crawling engines must use a document object model (DOM) of the web page to infer information regarding the state of the application. Crawling rich Internet applications is a problem that needs to be addressed to maintain the ability to search and test the web applications.

BRIEF SUMMARY

Embodiments relating to a computer-implemented process, an apparatus and a computer program product is provided for crawling rich Internet applications. In one aspect the method includes executing an event in a set of events discovered in a state exploration phase according to a predetermined priority of events in each set of events in the sets of events discovered, wherein the event from a higher priority is exhausted before an event from a lower priority is executed and determining any transitions. Responsive to a determination that there are at least one transition any remaining set of events is executed in a transition exploration phase. In addition the method determines the existence of any new states as a result of executing an event in the set of events and returning to the state exploration phase, responsive to a determination that a new state exists.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
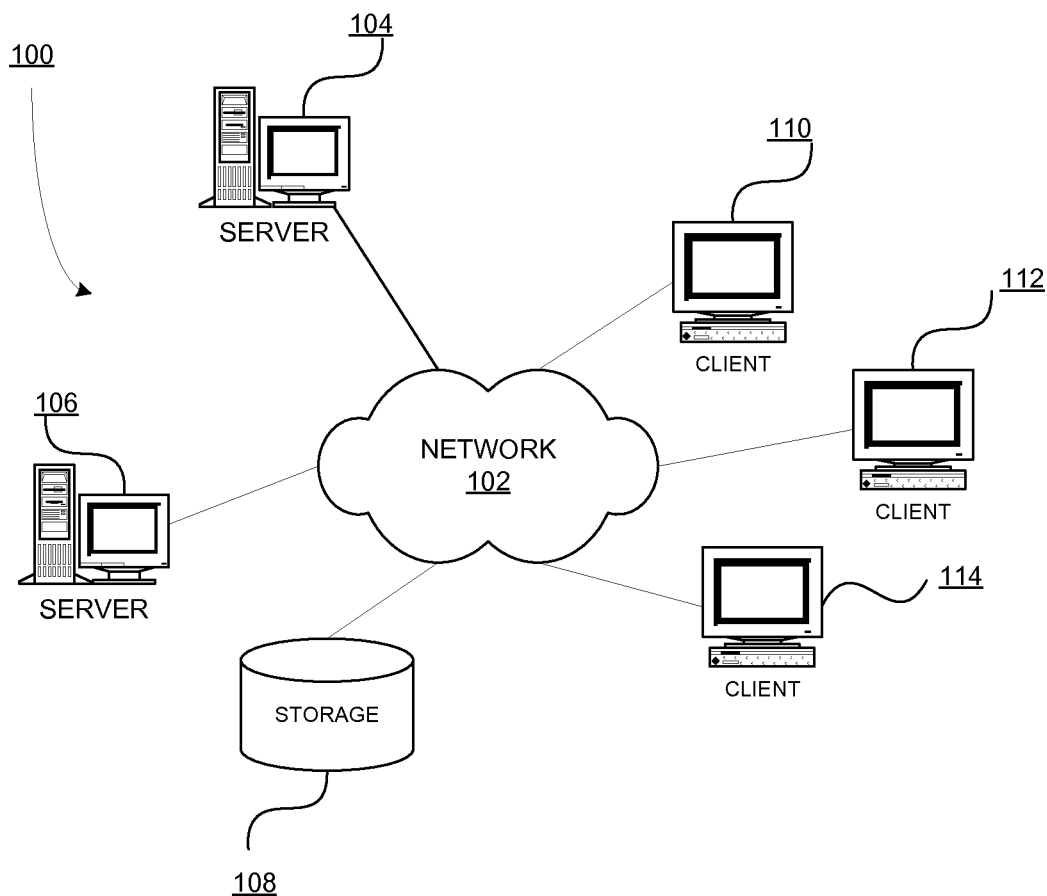
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
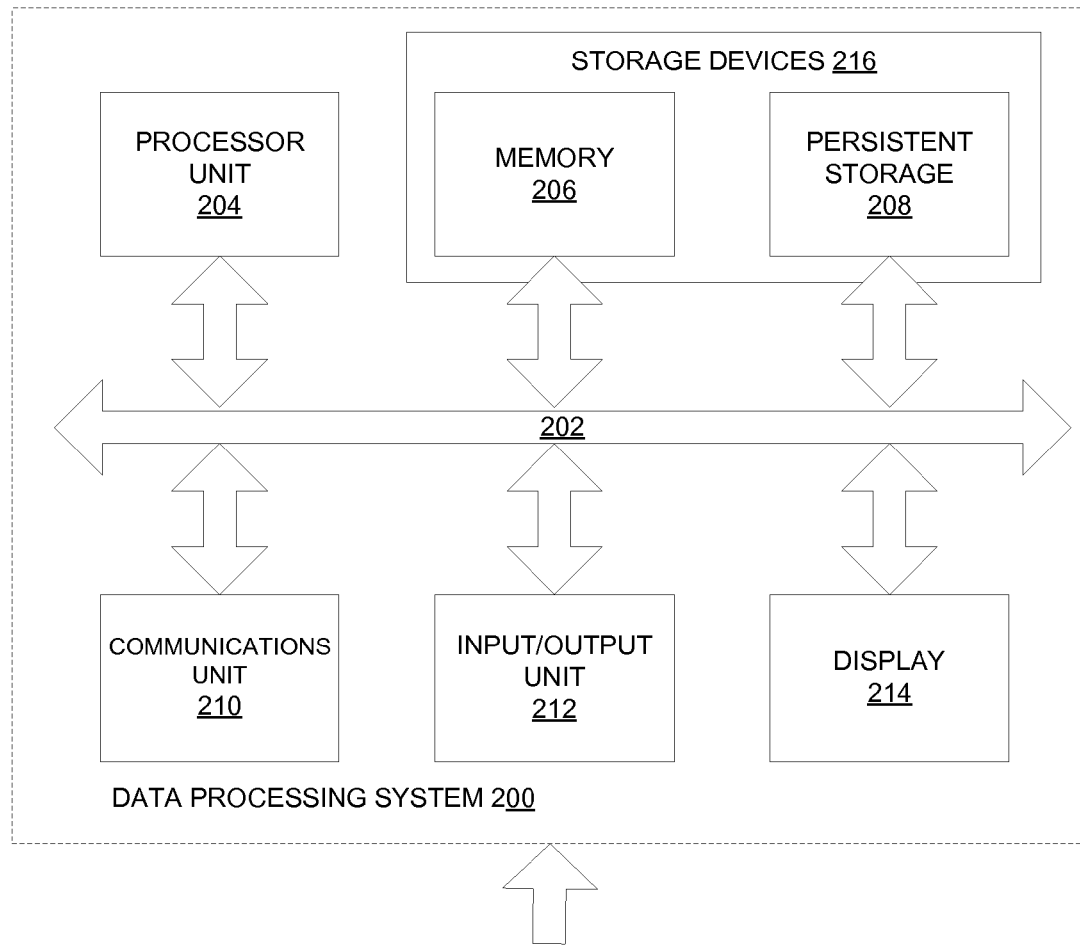
FIG. 2 is a block diagram of an exemplary data processing system operable for various embodiments of the disclosure.
Figure 2:
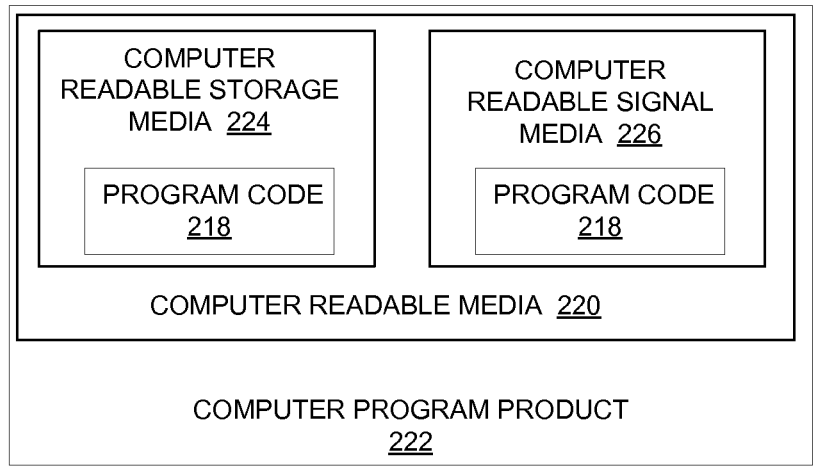

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of a system for crawling rich Internet applications may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown in the provision of an embodiment of a system for crawling rich Internet applications.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for crawling rich Internet applications is presented. Processor unit 204 executes sets of events discovered in a state exploration phase according to a predetermined priority of each set of events in the sets of events discovered, wherein events from a higher priority are exhausted before an event from a lower priority is executed. Responsive to a determination that transitions remain, processor unit 204 executes a set of events in a transition exploration phase. Processor unit 204 further determines whether a new state exists as a result of executing an event in the set of events and responsive to a determination that a new state exists, processor unit 204 returns to the state exploration phase.

Figure 3:
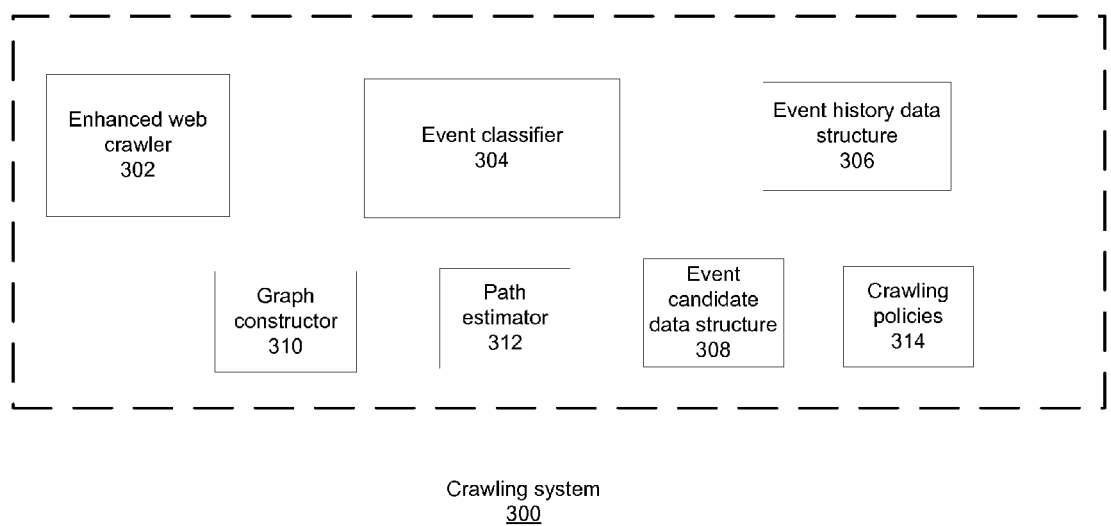
FIG. 3 is a block diagram representation of a crawling system operable for various embodiments of the disclosure.

With reference to FIG. 3 a block diagram representation of a crawling system operable for various embodiments of the disclosure is presented. Crawling system 300 is an example of an embodiment of the disclosure.

Crawling system 300 comprises a number of components leveraging support of an underlying data processing system such as network data processing 100 of FIG. 1 and data processing system 200 of FIG. 2. Components of crawling system 300 include a number of function elements comprising enhanced web crawler 302, event classifier 304, event history data structure 306, event candidate data structure 308, graph constructor 310, path estimator 312, and crawling policies 314.

The components of crawling system 300 may be implemented as discrete functional elements as in FIG. 3 or as various combinations of functional elements or as a monolithic structure combining all functional elements without loss of function.

Enhanced web crawler 302 provides a capability to explore web applications using a two-phase strategy. A first phase of the strategy is a state exploration phase and a second phase is a transition exploration phase.

Event classifier 304 provides a capability to identify a class or category from among a set of predetermined classes or categories into which a particular event is placed. The categorizations identify, in one example, particular JavaScript events as belonging to one of a set of predefined classifications including global unexecuted events, local unexecuted events, local uncategorized events, local menu events and non-menu events.

Event classification is based on the assumption that executing events with less execution history has more likelihood of generating new states rather than events that have been executed a number of times more. Based on this assumption, an event that has not been executed in the application has a higher likelihood of discovering a new state than events that have been executed a number of times. Using the hypothesis of unique mapping between the event execution and resultant state, the categorization described suggests any new event should generate new information or a new state of the application, when the application follows the hypothesis. To categorize any event, the event is executed. The more an event is executed the more accurate the information about the behaviour of that event becomes. An event can appear in multiple states (for example, about us event can appear in a home state, site map state, contact state, and even the about us state).

Using the example of JavaScript event classification, the state exploration phase categorizes events into a number of categories. Global unexecuted events are discovered events, which have never been executed in the application, for example, a scenario in which an about us event never executed. Local unexecuted events are discovered events, which have been executed at least once at some state of the application. For example, when some occurrences of the about us event, have been executed but not all occurrences. These events are further categorized into sub-categories of local uncategorized events, local menu events and non-menu events.

Local uncategorized events are events that have been executed just once at some state of the application (for example, executed only one instance of about us event). Local menu events are events that have resulted in the same resultant state at consecutive executions. These are the events that follow the previously recited hypothesis. For example, the about us event was executed twice from different states, and validated in both cases the website redirects the user to the same about us state.

Non-menu events are the events that have resulted in a different resultant state at consecutive executions. These are the events that do not follow the previously recited hypothesis. For example the Next page event is executed twice from different states, and observed that each time the user is presented with a different set of items on the page and therefore different states.

The state exploration phase assumes that events categorized as global unexecuted events, local uncategorized events, and local menu events are menu events, while events in the non-menu events category are non-menu events.

A primary goal of a typical crawling strategy is decide upon a next event to execute. To accomplish this, the disclosed process searches for events that have a higher probability to lead to new states, and only after those events have been executed does the disclosed process consider events with a lower probability of finding new states.

The discovered events are prioritized for execution from a higher priority to a lower priority. The global unexecuted events have a higher chance of leading to a new state, because they have not been executed before and are assumed to behave as menu events. The non-menu events have a high chance of leading to a new state every time they are executed but are known to not follow the assumption and are therefore not regarded as menu events. The local uncategorized events may lead to finding a new state, however until executed more than once the result is uncertain, therefore assumed to behave as menus until proven otherwise. The local menu events have a lower possibility of finding a new state. The events have been executed at least twice and each time redirecting the user to the same state. These events are known as menus and not executed again in a state exploration phase.

Event history data structure 306 provides a capability to save information associated with an event or set of events over a predetermined period of time. For example, a count of the number of occurrences a specific event has been executed and a resultant state for each occurrence can be saved and tracked. Candidate events are those which when executed have a high probability of leading to a new state. A probability of leading to a new state is also a portion of the classification process of event classifier 304.

Event candidate data structure 308 provides a capability to identify candidate events and to save the identified events for subsequent processing. Candidate events are those which when executed have a high probability of leading to a new state.

Graph constructor 310 provides a capability to generate a directed graph representation of a set of menu events and a set of corresponding states that are incident upon the set of menu events. Path estimator 312 provides a capability of identifying a least cost path for a set of identified events.

Crawling policies 314 provides a capability of defined procedures for determining a next event to execute when in a given state. For example, crawling policies 314 contains a set of policies including a basic crawling strategy of determining a next event to execute and a path policy which defines a search strategy to identify a shortest path to a next state having an action with the highest probability of leading to a new state.

Figure 4:
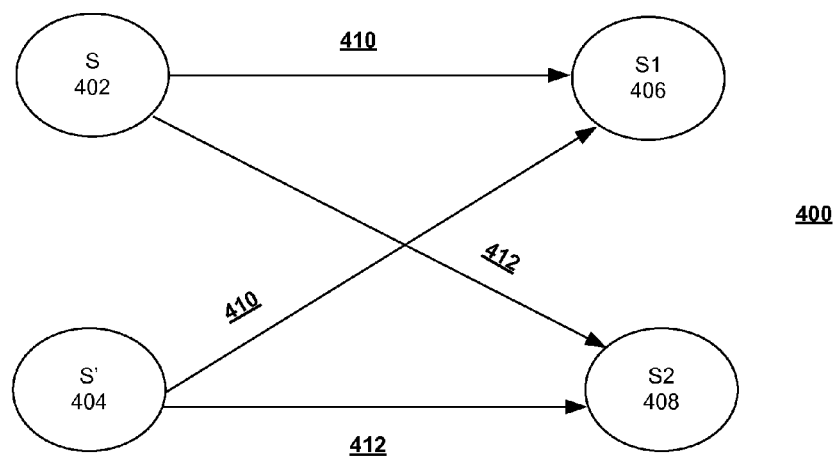
FIG. 4 is a block diagram of resulting states from an execution of events in accordance with one embodiment of the disclosure.

With reference to FIG. 4 a block diagram of states resulting from an execution of events in accordance with one embodiment of the disclosure. States 400 is an example of consistent behavior of a same event executed from different states.

In the following description a set of assumptions is used in the disclosure. There is a need to be able to explore state space of a web application in such a way that, when the process is not carried through to the end, partial information discovered is as rich as possible. In other words, given a run time of the process of the disclosure, the process disclosed should be able to assure that information found is as much as could be found. This implies rather than starting without a plan and assumptions to explore the system (such as a depth first search or a breath first search), starting with a hypothesis regarding behavior of the website and an underlying strategy for the assumptions of the disclosure typically ensures better results.

A proposed hypothesis of the disclosure defines a result of an event execution is independent of a state where the event has been executed. Therefore, the resultant state of an event execution is always the same. This assumes a one-to-one mapping between the event execution and the resultant state. In other words, for every JavaScript event on a particular page is considered to act as a menu event, that is: executing that event from any state, will always lead to the same resultant state. For example using home, contact us, site map, and about us the events act as menu events and will always lead the user to home, contact us, site map, and about us states respectively. In a typical website, representative buttons of the examples appear across multiple states, but regardless there will always be consistent behavior.

The nodes of S 402 S' 404, S1 406 and S2 408 of states 400 represent different states of a web application. Arcs 410 and 412 represent execution of a JavaScript event. As shown, executing event 410 will always result in the same state S1 406 irrespective of the source state, S 402 or S' 404.

Using the previously stated assumption, a new crawling strategy is proposed to explore the state space of the web application efficiently. The proposed crawling strategy has two phases comprising a state exploration phase and a transition exploration phase. The two phase strategy is proposed because a typical web application is too complex to be crawled completely, therefore it is important to explore, in a given time, as many states as possible and unless all transitions in the application have been explored, whether all states have been found cannot be determined with a high degree of confidence.

The state exploration phase attempts to locate all the states of the application as quickly as possible using the anticipated model. The state exploration phase tries to discover a new state in every step of the process when any exist. The exploration guarantees to discover a state at each step when the application completely follows the stated hypothesis.

Once the state exploration phase is assured all the possible states of the application have been discovered using the anticipated model, the process starts with the transition exploration phase in which the remaining transitions not executed during the state exploration phase are executed.

A primary goal of the state exploration phase is to find all the states of the application as soon as possible. The state exploration phase uses the hypothesis to construct every step of the strategy to discover a new state of the application when a new state exists. A single step of the strategy can require execution of more than one event.

The state exploration phase includes steps of classifying events in the states discovered so far into different sets of priorities. Events from a higher priority are exhausted first before an event from a lower priority set is executed.

The previous categorization uses the disclosed hypothesis to generate a set of best possible event execution candidates to discover new states of the application as quickly as possible.

Figure 5:
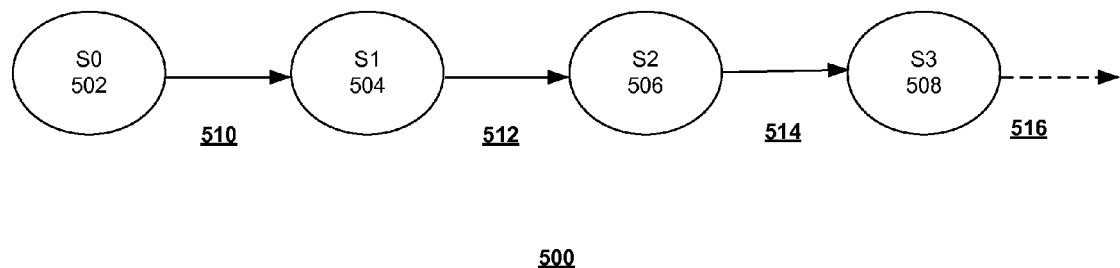
FIG. 5 is a block diagram of a path construction policy in accordance with one embodiment of the disclosure.

With reference to FIG. 5 a block diagram of using a path construction policy in accordance with one embodiment of the disclosure is presented. Path 500 is an example of using a path construction policy by the path estimator of crawling system 300 of FIG. 3.

For example, a path estimator using the path construction policy starts at a current state, for example, S to find a next event to execute. The path estimator uses a breadth first search to find the shortest path to a state, for example, S' that contains an action with the highest chance of leading to a new state. While searching for the shortest path to the state S', the path estimator uses assumptions about the uncategorized event and menu event results to build the path. The path estimator assumes the result of these events at any intermediate state in the path even when these events have not been executed at these states.

Using the example of path 500, event 512 is an uncategorized event and has not been executed at S1 504. Similarly, event 514 is a menu event, which has not been executed at S2 506. The path estimator uses a path construction policy with an assumption about the result of the events to find a shortest path to a target state of S3 508 having a next event 516 from S0 502 and execution of event 510. Accordingly using assumptions about the execution of events not executed locally at any intermediate step helps to find a shorter path rather than not using assumptions at all.

Because not all JavaScript events act as a menu in a website, there is a possibility an application will break the previously recited hypothesis, and hence the crawling strategy needs to adapt to such situations. In a state exploration phase, a path returned by the path estimator using a path construction policy uses assumptions about the event execution. However once the event has been executed there can be only two possible outcomes. In a first outcome, the assumption can be true. When the result of an uncategorized event assumption is true, then the assumption helps to categorize the event from an uncategorized list to a menu event. Thus the assumption helps with reaching the state to execute the next event and therefore helps to categorize events.

In a second outcome, the assumption is false. When the result of an uncategorized event assumption is false, the assumption still helps to categorize the event into a non-menu event. However, in this scenario two further possibilities of new states and known states arise. When the state reached is a new state, a new state is found on a shorter path than was returned by the path construction policy. However in a worst case, the result is an already known state. In this situation all current information about the path is ignored and a fresh start from the current state to find a path to the next event to execute is required.

The state exploration phase does not attempt to re-execute a local menu event once categorized. The assumption is valid because these events resulted in a same state in earlier consecutive executions and therefore have a high likelihood of resulting in the same resultant state for further executions.

Figure 6:
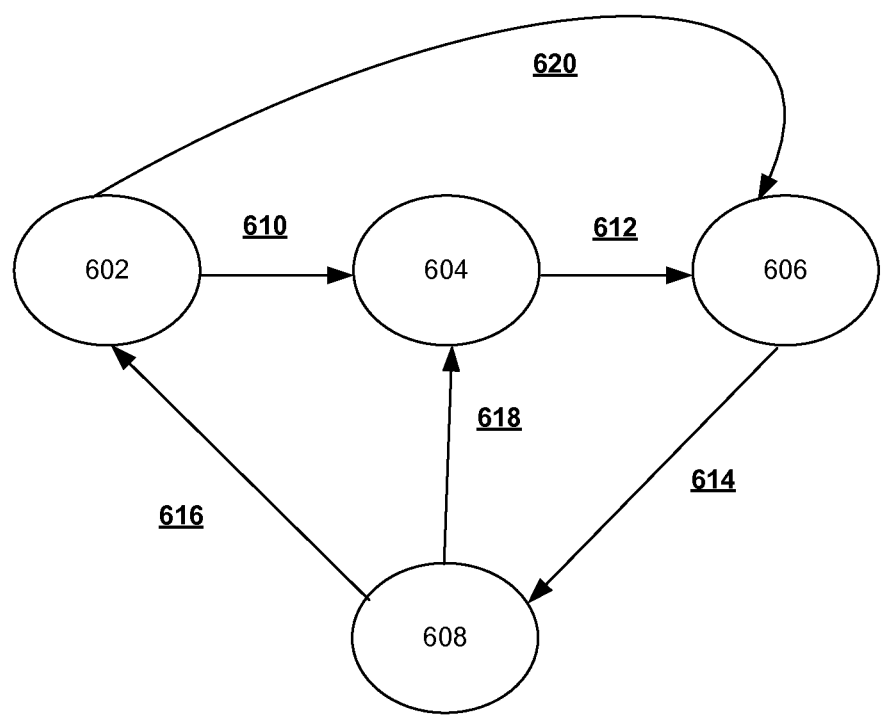
FIG. 6 is a block diagram of a tour of a directed graph in accordance with one embodiment of the disclosure.

With reference to FIG. 6 a block diagram of a tour of a directed graph in accordance with one embodiment of the disclosure is presented. Tour 600 is an example of state visitation during execution of events using crawling system 300 of FIG. 3.

Once the state exploration phase has completed executing all events of the application, except the local menu events, the crawling strategy moves to a transition exploration phase. A primary goal of the transition exploration phase is to validate all assumptions made regarding the local menu events. For example, assume a website has 6 occurrences of an about us event and during the state exploration phase the about us event was executed twice, however 4 more occurrences remain that are assumed to behave like a menu, but were not checked. The remaining 4 occurrences need to be executed once to validate. Events left for transition exploration phase are only to be menu events.

The problem is to create the shortest path in the application that enables execution of all unexecuted events in a minimal number of steps. The transition exploration phase constructs a directed graph, G=(V, E) in which E=set of menu events (for example, event 610 to event 620) and V=set of states that are incident upon these events (for example, state 602 to state 608). The transition exploration phase is required to execute all events in the set of menu events at least once. Execution of the remaining events in the transition exploration phase is synonymous with edge exploration of a graph wherein for a specific graph a least cost path is required such that each edge is visited at least once. The least cost path is defined by a number of methods, for example, the postman tour of the graph (Route Inspection Problem http://xlinux.nist.gov/dads/HTML/chinesePostman.html (National Institute of Standards and Technology). Given a graph, G=(V, E) and associated edge cost for each edge of the graph, the postman tour provides a least cost path through the graph such that each edge is visited at least once. An associated cost of executing an event (for example, CPU cycles or time required) is the cost of the edge in the graph, G. For simplicity the execution cost of each events is assumed to be the same.

The transition exploration phase of the example starts with defining a postman tour on the graph G. The tour provides a sequence in which the events should be executed. For example, assuming all events have the same execution count, the least cost path covering each event is estimated as the tour comprising a sequence of event 610, event 612, event 614, event 616, event 620, event 614 and event 618.

Once the tour is defined, situations can arise in which initial assumptions are not followed by the application (for example, the previously considered menu events do not behave like menus) and the resultant states are different from assumed states. Accordingly, two situations arise for a resultant state: a known state and a new state.

Figure 7:
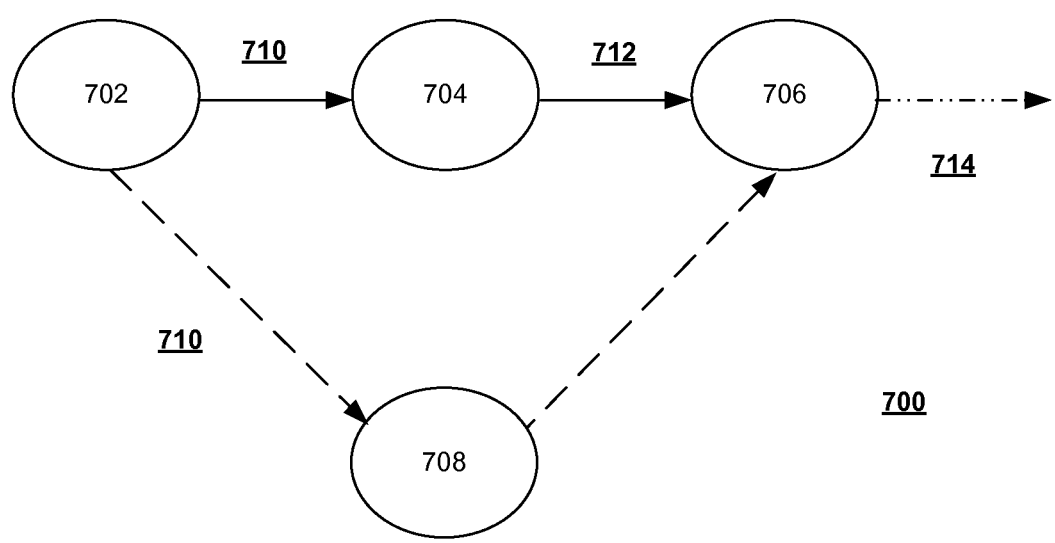
FIG. 7 is a block diagram of a shortest path example in accordance with one embodiment of the disclosure.

With reference to FIG. 7 a block diagram of a shortest path example in accordance with one embodiment of the disclosure is presented. Tour 700 using a route inspection method, such as the postman tour, to identify events to execute in an identified sequence encounters a violation (of the hypothesis) and a known state.

When the violated state associated with an event is an already known state, the violation is ignored and processing continues with the execution of events as specified by the tour. The disclosed process begins in current state 702 and attempts to reach state 706 to execute a next unexecuted event 714. The disclosed process follows the route inspection problem method or tour, which specifies event 710 and event 712 need to be executed from the current state 702. However, as a result of executing event 710, the web page is redirected to a new state 708 rather than state 704.

In this situation, the process attempts to find the shortest path from state 708 to state 706 (which can be more than one or a sequence of events) to execute the next event 714 in state 706. Accordingly for all assumption violations resulting in already known states, the disclosed process ignores the violation and re-aligns to the sequence of events provided by the tour.

Figure 8:
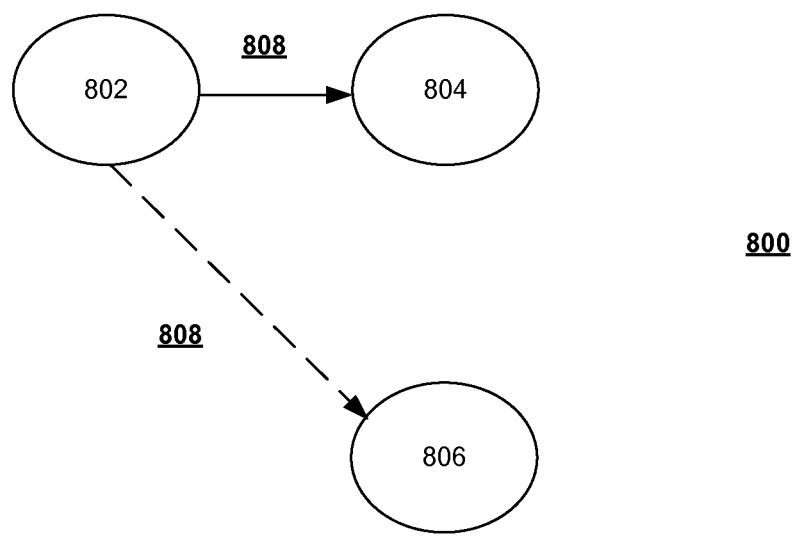
FIG. 8 is a block diagram of the shortest path example of FIG. 7 with a new state in accordance with one embodiment of the disclosure.

With reference to FIG. 8 a block diagram of a shortest path example in accordance with one embodiment of the disclosure is presented. Tour 800 using a route inspection problem method to identify events to execute in an identified sequence encounters a violation and a new state.

When a violation of assumptions results in a new state, the disclosed process in tour 800 switches from the transition exploration phase to the state exploration phase to enable discovery of all states of the application quickly. The process of tour 800 begins in state 802 and executes event 808. In one result state 804 is achieved however in another result state 806 is achieved. Because the process did not discover and explore this new state (state 806) earlier, there are chances more new states may exist. The transition exploration phase is suspended and the state exploration phase is restarted to discover potential new states.

Figure 9:
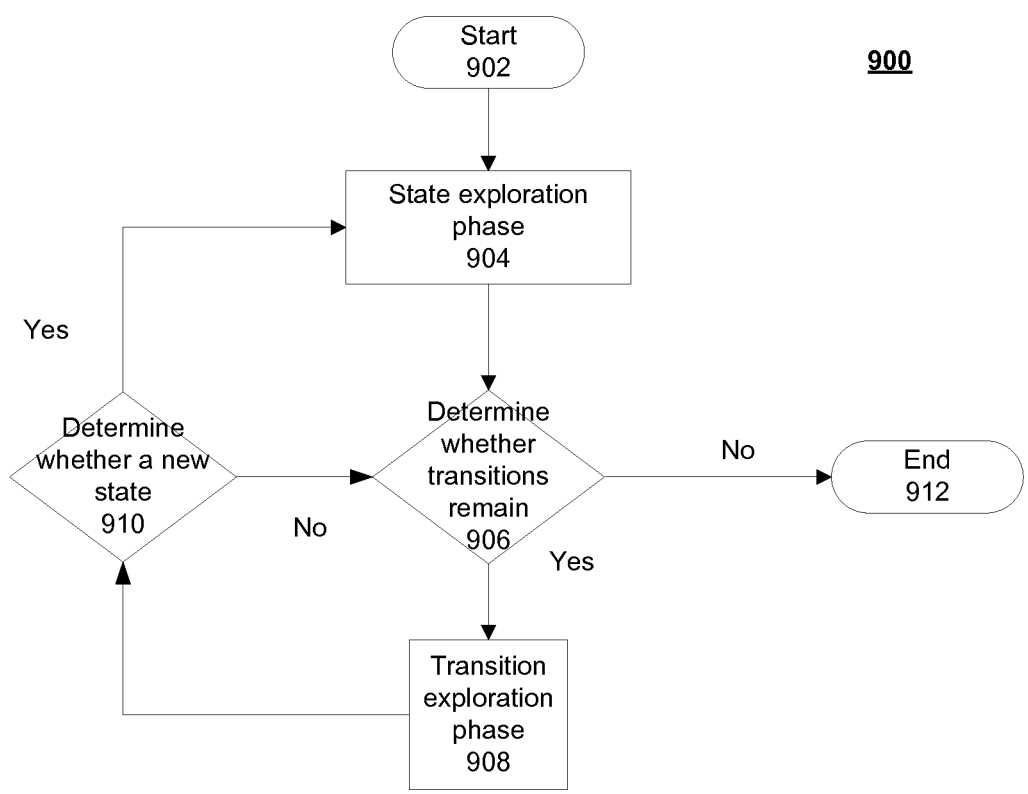
FIG. 9 is a flowchart of a process using the crawling system of FIG. 3 operable for various embodiments of the disclosure.

With reference to FIG. 9 a flowchart of a process using the crawling system of FIG. 3 operable for various embodiments of the disclosure is presented. Process 900 is an example of a two-phase process including a state exploration phase and a transition exploration phase of crawling system 300 of FIG. 3.

Process 900 is representative of a high level view of the two-phase process of crawling system 300 of FIG. 3. Process 900 begins and commences a state exploration phase (step 904). The state exploration phase of process 900 analyzes a received web application to discover all states of the received application with as least effort and time as possible. Events associated with each identified state are executed according to a predetermined priority sequence and a result of each event execution is noted.

Process 900 determines whether transitions remain (step 906). Process 900 presumes to have executed the events associated with each identified state except any events categorized previously as local menu events. Responsive to a determination that no transitions remain, process 900 terminates (step 912). Responsive to a determination that transitions remain, process 900 commences the transition exploration phase (step 908). The transition exploration phase validates all assumptions made regarding the local menu events by executing the remaining local menu events.

Process 900 determines whether a new state results from execution of a remaining local menu event during the transition exploration phase (step 910). Responsive to a determination that a new state results, process 900 returns to perform state exploration phase (step 904) as before. Responsive to a determination that no new state results, process 900 returns to determine whether transitions remain (step 906) as before.

Process 900 accordingly processes a set of states and associated events of the particular application using a shortest path to a next event for events associated with a respective state in the set of states.

Figure 10:
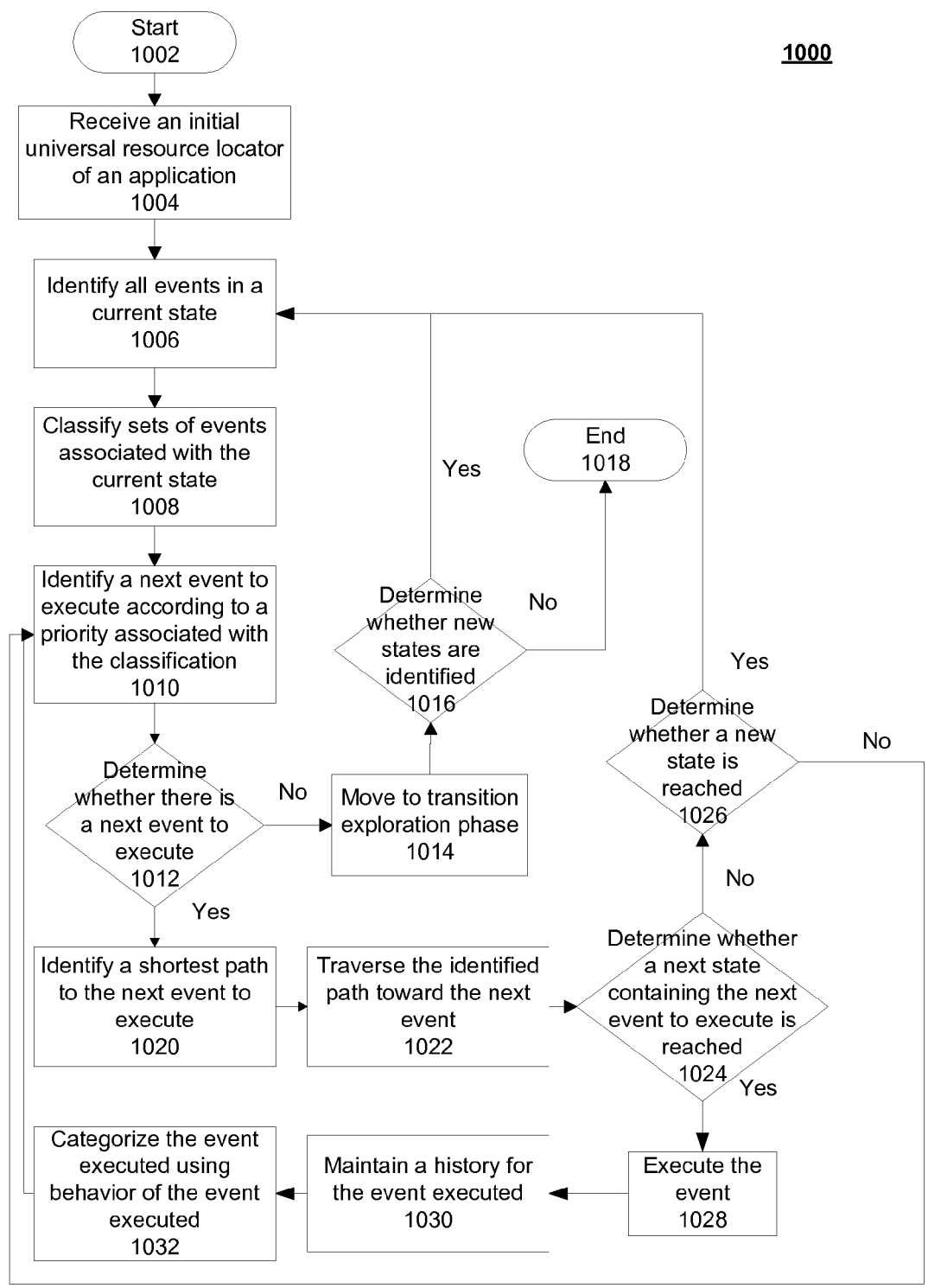
FIG. 10 is a flowchart of a state exploration phase using the crawling system of FIG. 3 operable for various embodiments of the disclosure.

With reference to FIG. 10 a flowchart of a state exploration phase using the crawling system of FIG. 3 operable for various embodiments of the disclosure is presented. Process 1000 is an example of the state exploration phase portion of the two-phase process of crawling system 300 of FIG. 3.

Process 1000 begins (step 1002) and receives a universal resource locator of an application (step 1004). The application in this case is a web application and the universal resource locator typically refers to a web page. Process 1000 attempts to identify all events in a current state of the application (step 1006).

Process 1000 classifies a set of events associated with the current state (step 1008). Process 1000 identifies a next event to execute according to a priority associated with the classification (step 1010). Process 1000 determines whether there is a next event to execute (step 1012). Responsive to a determination that there is no next event to execute, process 1000 moves to a transition exploration phase (step 1014). Process 1000 determines whether new states are identified (step 1016). Responsive to a determination no new states are identified, process 1000 terminates (step 1018). Responsive to a determination new states are identified, process 1000 returns to execute step 1006 as before.

Responsive to a determination that there is a next event to execute, process 1000 identifies a shortest path to the next event to execute (step 1020). The path is determined by selecting events that have a higher probability of leading to a new state. Process 1000 traverses the identified shortest path toward the next event (step 1022). Process 1000 determines whether a next state containing a next event to execute is reached (step 1024).

Responsive to a determination that the next state containing the next event to execute is reached, process 1000 executes the event (step 1028). Process 1000 maintains a history for the event executed (step 1030). The history comprises data including a count representative of a number of occurrences an event was executed. Process 1000 categorizes the event executed using behavior of the event executed (step 1032). Process 1000 returns to execute step 1010 as before.

Responsive to a determination that the next state containing the next event to execute is not reached, process 1000 determines whether a new state is reached (step 1026). Responsive to a determination that a new state is not reached process 1000 returns to execute step 1010 as before. Responsive to a determination that a new state is reached process 1000 returns to execute step 1006 as before.

Figure 11:
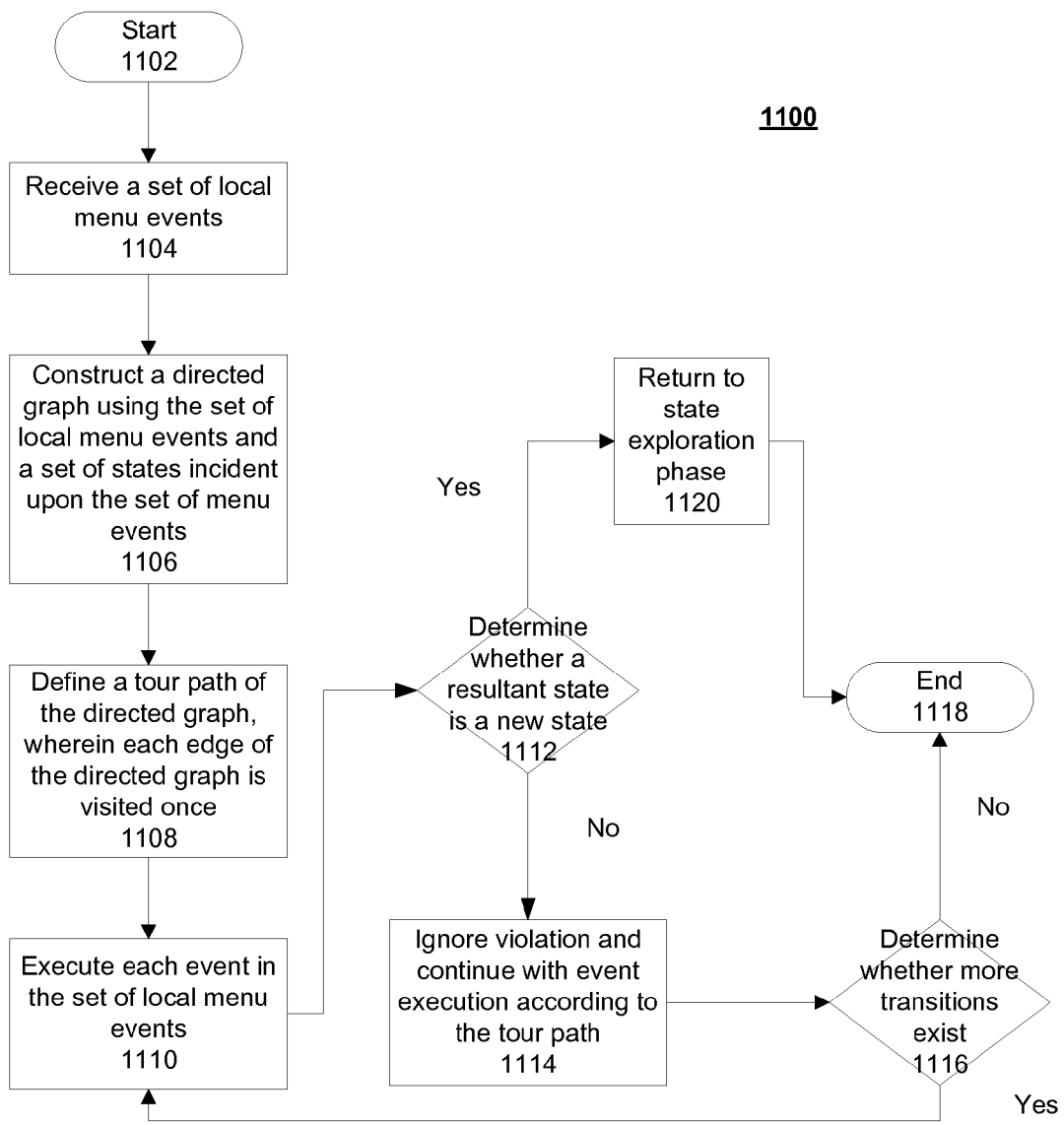
FIG. 11 is a flowchart of a transition exploration phase using the crawling system of FIG. 3 for various embodiments of the disclosure.

With reference to FIG. 11 a flowchart of a transition exploration phase using the crawling system of FIG. 3 operable for various embodiments of the disclosure is presented. Process 1100 is an example of the transitions exploration phase of crawling system 300 of FIG. 3.

Process 1100 begins (step 1102) and receives a set of local menu events (step 1104). The local menu events are a set of events that remain from the completion of the state exploration phase of processing using crawling system 300 of FIG. 3. Process 1100 constructs a directed graph using the set of local menu events and a set of states incident upon the set of menu events (step 1106). Each local menu event in the set of local menu events has a corresponding state incident upon the local menu event.

Process 1100 defines a tour path of the directed graph, wherein each edge of the directed graph is visited once (step 1108). Process 1100 executes each event in the set of local menu events (step 1110). For each event executed, process 1100 determines whether a resultant state is a new state (step 1112).

Responsive to a determination that the resultant state is a new state, process 1100 returns to state exploration phase (step 1120) and terminates thereafter (step 1118).

Responsive to a determination that the resultant state is not a new state, process 1100 ignores a violation and continues with event execution according to the tour path (step 1114). Process 1100 determines whether more transitions exist (step 1116).

Responsive to a determination that more transitions exist, process 1100 returns to step 1110 as before. Responsive to a determination that no more transitions exist, process 1100 terminates (step 1118).

Thus is presented in an illustrative embodiment a computer-implemented process for crawling rich Internet applications executes sets of events discovered in a state exploration phase according to a predetermined priority of each set of events in the sets of events discovered, wherein events from a higher priority are exhausted before an event from a lower priority is executed and responsive to a determination that transitions remain, executes a set of events in a transition exploration phase. The computer-implemented process further determines whether a new state exists as a result of executing an event in the set of events and responsive to a determination that a new state exists, returning to the state exploration phase.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for crawling rich Internet applications, comprising:
   executing an event in a set of events discovered in a state exploration phase according to a predetermined priority of events in each set of events in the sets of events discovered, wherein the event from a higher priority is exhausted before an event from a lower priority is executed;
   determining any transitions;
   executing a remaining set of events in a transition exploration phase, responsive to a determination that there are at least one transition;
   determining existence of any new states as a result of executing an event in the set of events; and
   returning to the state exploration phase, responsive to a determination that a new state exists;
   wherein executing sets of events discovered in the state exploration phase comprises:

identifying all events in a current state with respect to an application;

classifying sets of events associated with the current state to form classified events;

identifying a next event to execute according to a priority associated with the classification;

in response to determining there exists a next event to execute, identifying a shortest path to the next event to execute responsive to a determination that a next event exists for execution, comprising:

estimating the shortest path by a path estimator using a path construction policy starting at the current state using a breadth first search to find the shortest path to a state that contains an action with a highest chance of leading to a new state, wherein the path estimator uses assumptions about uncategorized event and menu event results to build the path which includes one or more events.

2. The computer-implemented process of claim 1, wherein executing sets of events discovered in a state exploration phase further comprises:

traversing the identified path toward the next event responsive to identifying the shortest path;

determining when a next state containing the next event to execute is reached;

executing the event, responsive to a determination that the next state containing the next event to execute is reached;

maintaining a history for each event executed;

categorizing the event executed using behavior of the event executed;

determining when a new state is reached, responsive to a determination the next state containing the next event to execute is not reached executing the event returning to identify all events in the current state, responsive to a determination that the new state is reached, responsive to a determination that the new state is not reached, returning to identify a next event to execute according to a priority associated with the classification;

moving to a transition exploration phase, responsive to a determination that there are no more events remaining for execution and responsive to determining whether new states are identified; and returning to identify all events in the current state, responsive to a determination new states are identified.

3. The computer-implemented process of claim 1, wherein the predetermined priority of each set of events in the sets of events discovered is determined by a classification selected from a group comprising including global unexecuted events, local unexecuted events, local uncategorized events, local menu events and non-menu events.

4. The computer-implemented process of claim 1, wherein executing a set of events in a transition exploration phase further comprises:

receiving a set of local menu events;

constructing a directed graph using the set of local menu events and a set of states incident upon the set of menu events;

defining a tour path of the directed graph, wherein each edge of the directed graph is visited once executing each event in the set of local menu events;

determining whether a resultant state is a new state;

responsive to a determination that the resultant state is a new state, returning to the state exploration phase; and responsive to a determination that the resultant state is not a new state, ignoring a violation and continuing with event execution according to the tour path.

5. The computer-implemented process of claim 1, wherein executing each set of events according to a priority associated with the classification of events further comprises:

selecting events that have a higher probability of leading to a new state for execution prior to selecting events in the sets of events having a lower probability of leading to a new state.

6. The computer-implemented process of claim 2, wherein maintaining a history for the event executed further comprises:

collecting data associated with each event for each event including a count representative of a number of occurrences the each event was executed.

7. A computer program product for crawling rich Internet applications, the computer program product comprising:

a computer recordable-type storage media containing computer executable program code stored thereon, the computer executable program code comprising:

computer executable program code for executing sets of events discovered in a state exploration phase according to a predetermined priority of each set of events in the sets of events discovered, wherein events from a higher priority are exhausted before an event from a lower priority is executed;

computer executable program code for determining whether transitions remain;

computer executable program code responsive to a determination that transitions remain, for executing a set of events in a transition exploration phase;

computer executable program code for determining whether a new state exists as a result of executing an event in the set of events; and computer executable program code responsive to a determination that a new state exists, for returning to the state exploration phase;

wherein executing sets of events discovered in the state exploration phase comprises:

identifying all events in a current state with respect to an application;

classifying sets of events associated with the current state to form classified events;

identifying a next event to execute according to a priority associated with the classification;

in response to determining there exists a next event to execute, identifying a shortest path to the next event to execute responsive to a determination that a next event exists for execution, comprising:

estimating the shortest path by a path estimator using a path construction policy starting at the current state using a breadth first search to find the shortest path to a state that contains an action with a highest chance of leading to a new state, wherein the path estimator uses assumptions about uncategorized event and menu event results to build the path which includes one or more events.

8. The computer program product of claim 7, wherein computer executable program for executing sets of events discovered in a state exploration phase further comprises:

computer executable program code for traversing the identified path toward the next event responsive to identifying the shortest path;

computer executable program code for determining whether a next state containing the next event to execute is reached;

computer executable program code responsive to a determination the next state containing the next event to execute is reached, for executing the event;

computer executable program code for maintaining a history for each event executed;

computer executable program code for categorizing the event executed using behavior of the event executed;

computer executable program code responsive to a determination the next state containing the next event to execute is not reached executing the event, for determining whether a new state is reached;

computer executable program code for responsive to a determination that the new state is reached, for returning to identify all events in the current state;

computer executable program code responsive to a determination that the new state is not reached, for returning to identify a next event to execute according to a priority associated with the classification;

computer executable program code responsive to a determination there is not a next event to execute, for moving to a transition exploration phase;

computer executable program code for determining whether new states are identified; and computer executable program code responsive to a determination new states are identified, for returning to identify all events in the current state.

9. The computer program product of claim 7, wherein the predetermined priority of each set of events in the sets of events discovered is determined by a classification selected from a group comprising including global unexecuted events, local unexecuted events, local uncategorized events, local menu events and non-menu events.

10. The computer program product of claim 7, wherein computer executable program code for executing a set of events in a transition exploration phase further comprises:
   computer executable program code for receiving a set of local menu events;
   computer executable program code for constructing a directed graph using the set of local menu events and a set of states incident upon the set of menu events;
   computer executable program code for defining a tour path of the directed graph, wherein each edge of the directed graph is visited once
   computer executable program code for executing each event in the set of local menu events;
   computer executable program code for determining whether a resultant state is a new state;
   computer executable program code responsive to a determination that the resultant state is a new state, for returning to the state exploration phase; and
   computer executable program code responsive to a determination that the resultant state is not a new state, for ignoring a violation and continuing with event execution according to the tour path.

11. The computer program product of claim 7, wherein computer executable program code for executing each set of events according to a priority associated with the classification of events further comprises:
   computer executable program code for selecting events that have a higher probability of leading to a new state for execution prior to selecting events in the sets of events having a lower probability of leading to a new state.

12. The computer program product of claim 8, wherein computer executable program code for maintaining a history for the event executed further comprises:
   computer executable program code for collecting data associated with each event for each event including a count representative of a number of occurrences the each event was executed.

13. An apparatus for crawling rich Internet applications, the apparatus comprising:
   a communications fabric;
   a memory connected to the communications fabric, wherein the memory contains computer executable program code;
   a communications unit connected to the communications fabric;
   an input/output unit connected to the communications fabric;
   a display connected to the communications fabric; and
   a processor unit connected to the communications fabric, wherein the processor unit executes the computer executable program code to direct the apparatus to:
   execute sets of events discovered in a state exploration phase according to a predetermined priority of each set of events in the sets of events discovered, wherein events from a higher priority are exhausted before an event from a lower priority is executed;
   determine whether transitions remain;
   responsive to a determination that transitions remain, execute a set of events in a transition exploration phase;
   determining whether a new state exists as a result of executing an event in the set of events; and
   responsive to a determination that a new state exists, return to the state exploration phase;
   wherein executing sets of events discovered in the state exploration phase comprises:
   identifying all events in a current state with respect to an application;
   classifying sets of events associated with the current state to form classified events;
   identifying a next event to execute according to a priority associated with the classification;
   in response to determining there exists a next event to execute, identifying a shortest path to the next event to execute responsive to a determination that a next event exists for execution, comprising:
   estimating the shortest path by a path estimator using a path construction policy starting at the current state using a breadth first search to find the shortest path to a state that contains an action with a highest chance of leading to a new state, wherein the path estimator uses assumptions about uncategorized event and menu event results to build the path which includes one or more events.

14. The apparatus of claim 13, wherein the processor unit executes the computer executable program code to execute sets of events discovered in a state exploration phase further directs the apparatus to:
   traverse the identified path toward the next event, responsive to identifying the shortest path;
   determine whether a next state containing the next event to execute is reached;
   responsive to a determination the next state containing the next event to execute is reached, execute the event;
   maintain a history for each event executed;
   categorize the event executed using behavior of the event executed;
   responsive to a determination the next state containing the next event to execute is not reached executing the event, determine whether a new state is reached;
   responsive to a determination that the new state is reached, return to identify all events in the current state;
   responsive to a determination that the new state is not reached, return to identify a next event to execute according to a priority associated with the classification;

responsive to a determination there is not a next event to execute, move to a transition exploration phase;

determining whether new states are identified; and responsive to a determination new states are identified, return to identify all events in the current state.

15. The apparatus of claim 13, wherein the predetermined priority of each set of events in the sets of events discovered is determined by a classification selected from a group comprising including global unexecuted events, local unexecuted events, local uncategorized events, local menu events and non-menu events.

16. The apparatus of claim 13, wherein the processor unit executes the computer executable program code to execute a set of events in a transition exploration phase further directs the apparatus to:

receive a set of local menu events;

construct a directed graph using the set of local menu events and a set of states incident upon the set of menu events;

define a tour path of the directed graph, wherein each edge of the directed graph is visited once execute each event in the set of local menu events;

determine whether a resultant state is a new state;

responsive to a determination that the resultant state is a new state, return to the state exploration phase; and responsive to a determination that the resultant state is not a new state, ignore a violation and continue with event execution according to the tour path.

17. The apparatus of claim 13, wherein the processor unit executes the computer executable program code to execute each set of events according to a priority associated with the classification of events further directs the apparatus to:

select events that have a higher probability of leading to a new state for execution prior to selecting events in the sets of events having a lower probability of leading to a new state.

\* \* \* \* \*